United States Patent [19]

Reynolds et al.

[11] Patent Number: 5,719,341
[45] Date of Patent: Feb. 17, 1998

[54] APPARATUS FOR MEASURING FLUID FLOW VELOCITY BY INJECTING LIQUIFIED GAS

[75] Inventors: Patrick John Reynolds, Oxford; John Keith Bartington, Frating, both of England

[73] Assignee: British Technology Group Limited, London, England

[21] Appl. No.: 513,784

[22] PCT Filed: Mar. 14, 1994

[86] PCT No.: PCT/GB94/00499

§ 371 Date: Aug. 29, 1995

§ 102(e) Date: Aug. 29, 1995

[87] PCT Pub. No.: WO94/20825

PCT Pub. Date: Sep. 15, 1994

[30] Foreign Application Priority Data

Mar. 12, 1993 [GB] United Kingdom .................. 9305088

[51] Int. Cl.⁶ ............................................. G01F 1/68
[52] U.S. Cl. ........................................... 73/861.95
[58] Field of Search ........................ 73/861.04, 861.05, 73/861.95, 204.13, 204.23

[56] References Cited

U.S. PATENT DOCUMENTS

| | | |
|---|---|---|
| 2,799,165 | 7/1957 | Varvel ............................ 73/861.95 |
| 4,228,683 | 10/1980 | Juffa et al. ..................... 73/861.95 |
| 4,237,730 | 12/1980 | Feng ............................. 73/861.95 |
| 4,704,904 | 11/1987 | McKie ........................... 73/204.13 |
| 4,848,147 | 7/1989 | Bailey et al. ................... 73/204.17 |
| 5,526,696 | 6/1996 | Cappi ........................... 73/861.95 |

FOREIGN PATENT DOCUMENTS

| | | |
|---|---|---|
| 127790 | 9/1988 | European Pat. Off. . |
| 2518257 | 6/1983 | France . |
| 2585465 | 1/1987 | France ......................... 73/861.95 |
| 3301855 | 7/1984 | Germany . |
| 9309404 | 5/1993 | WIPO . |

OTHER PUBLICATIONS

C.R. Dudgeon et al, "Heat-Pulse Flowmeter For Boreholes" Water Research Centre, Technical Report, Mar. 1975 pp. 1-69.

Primary Examiner—George M. Dombroske
Assistant Examiner—Harshad Patel
Attorney, Agent, or Firm—Cushman, Darby & Cushman IP Group of Pillsbury, Madison & Sutro LLP

[57] ABSTRACT

An apparatus for measuring fluid flow velocity includes structure for varying an energy content of a volume of a fluid at a first pre-selected point to the flow path and structure for detecting the variation in the energy content of the fluid at a second pre-selected point in the flow path. The structure for varying the energy content includes structure for injecting a quantity of liquified gas into the fluid thereby to cause variation in the energy content. A method for measuring fluid flow velocity is also disclosed.

11 Claims, 9 Drawing Sheets

APPARATUS FOR MEASURING FLUID FLOW VELOCITY BY INJECTING LIQUIFIED GAS

The present invention relates to methods of measuring the velocity of flow of a liquid or gas (fluid), along a pipeline for example, and to apparatus for carrying out such measurement.

Various methods for measuring flow rates of liquids and gases have been proposed hitherto. For gases, these include rotameters and turbinemeters, measuring the kinetic energy of the gas or measurement based on thermal losses.

Some of the aforementioned techniques have the disadvantage that they have to be calibrated for the specific properties of the gas whose flow rate is being measured. In addition many standard techniques involve a substantial pressure drop along the path of fluid flow. The present invention is particularly suited for use in a low mass flow application, typically 0–10 $m^3 hr^{-1}$.

Examples of other types of fluid velocity measurement are described below.

German Patent Application DE-A-3301855 describes a method of labelling a fluid using acoustic or vibrational pulses. These are converted into electric pulses and combined with characteristic data of the medium to provide information on velocity of the fluid. The method is well developed. The technique is influenced by the fluid being measured. It is a "time of transit" method.

French Patent Application FR-A-2518257 describes a thermal labelled time of transit method of measuring fluid flow and a related device. Fluid enters tangentially into a vortex chamber and fluid velocity is measured within the chamber.

French Patent Application FR-A-2585465 describes an apparatus for measuring flow velocity which removes a volume of fluid from a flow path and replaces it with a substantially equal volume of thermally labelled fluid. The apparatus then detects the "time of flight" of the thermally labelled fluid and calculates the flow velocity.

WO-A-9309404 describes an apparatus for measuring flow velocity, using a time-of-flight measurement.

A flowmeter for measuring the velocity of water along boreholes has been proposed in a technical report of the Water Research Centre entitled "Heat-Pulse Flowmeter for Boreholes" by C. R. Dudgeon et al. dated March 1975. The flowmeter operates by forming a thermal pulse in water, by passing the water over a heating grid, and detecting the passing of the thermal pulse downstream of the formation point. This method has worked satisfactorily for water in which the kinetic energy of the molecules is relatively low. The method is known as thermal labelling and a thermal pulse was used for this purpose.

U.S. Pat. No. 4,228,683 describes a method for thermal labelling of a transient fluid. Fluid is deflected through one pipe and then returned to a second where it is sensed. A variety of sensors may be used. However, the basic method may not be intrinsically safe for use in explosive environments. Use is made of a differential output from thermocouples to operate a flip-flop. This requires a threshold sensing device and a comparator in order to calibrate the system.

A first aspect of the present invention is based on the surprising discovery that thermal labelling also works for gases, in which the molecules are moving relatively quickly. It might be expected that any thermal pulse produced in a gas would dissipate in too short a time for its velocity to be measured but experiments, to be described below, have demonstrated that this is not the case.

In addition, the invention overcomes problems experienced with existing thermal labelling techniques, in that such techniques are not capable of being used safely in explosive and/or corrosive environments. An example of an explosive and/or corrosive environment is a land-fill site, where refuse is tipped and covered. Increasingly gases, usually methane, are collected from these land-fill sites and used to generate electricity.

It has been a problem to safely and accurately measure and monitor the amount of gases produced. The present invention overcomes this problem and removes the need for prior calibration of equipment.

According to a further aspect of the present invention there is provided apparatus for measuring fluid flow velocity comprising: means for varying the energy content of a volume of fluid at a first preselected point in a flow path and means for detecting a said variation in energy at a second preselected point in the flow path, characterised in that said variation in energy involves a localised decrease in temperature of the fluid being measured.

Preferably the time taken for the fluid to pass from the second preselected point to a third, or subsequent, preselected point, is measured. The fact that the time interval is measured between at least two points, subsequent to the position at which the temperature variation occurs, enables the temperature variation to acquire a stable form within the flow. It might be thought that this feature of the invention would lead to inaccuracies occurring in detection of the said temperature variation(s). However, an advantageous feature of the present invention includes detection means, arranged to detect the variation in temperature at the, or each, preselected position by detecting the peak of the said variation. Thus, even if the amplitude of the pulse diminishes along the fluid path, detection of the same relative position of the said pulse is ensured. It has been found that variation In the position of a peak of a pulse, relative to the beginning and end of the pulse, is negligible. Thus detection of the peak is preferred to detection of leading or trailing edges of pulses.

This feature of the invention enables precise measurement of "time of flight" of pulses to be detected; and, because no datum is required, removes the requirement of time consuming calibration of the apparatus for measuring fluid velocity.

The time taken for the change in temperature to be carried along a pipe is detected and recorded. This gives an indication of flow velocity as described below. However, means may be provided to detect variation in variables other than temperature. For example, means may be provided to detect variation in: density of the fluid, electrical conductivity of the fluid or polarisability of the fluid.

Preferably the fluid is in a gaseous phase and at least two subsequent temperature measurements are made. Thus, corresponding to the first aspect of the present invention there is provided a method of measuring the flow velocity of a gas comprising heating, or cooling, the gas at a selected point along its flow path and detecting the time taken for the temperature of the gas upstream or downstream of the selected point to arrive at a subsequent point or points.

Preferably detection is carried out at a point substantially on an axis of symmetry of the contained flow, such that detection occurs away from the boundary layer.

The present invention also provides various methods of producing and detecting a thermal pulse in a fluid.

Preferably a cooler produces a cold pulse in the fluid and means is provided for downstream detection of the cold pulse. Timing the arrival of a temperature change, arising as a result of the cold pulse enables its time of flight, and hence velocity, to be calculated. In addition the present invention, in an alternative embodiment, has steady-state heating of a heat source, followed by momentary termination of the heating. In effect this is a cooling by absence of heating to produce a cool pulse.

It will be appreciated that the aforementioned two techniques are effectively the same, as a volume of the fluid being measured undergoes momentary cooling with respect to an adjacent volume of the fluid, for a predetermined duration of time. It is this volume which defines a cool thermal pulse. However, it is prerequisite that a step change in temperature occurs.

The invention originated from a requirement for intrinstic safety in explosive environments. Another problem which was to be solved, was that of the corrosive environment in which the apparatus was to be located and that it should not be substantially affected by corrosive or saturated vapour. To this end a wide range of safe labelling methods has been proposed. Since preliminary calculations and experiments suggested that direct resistive heating was not a possibility in a practical, safe application, efforts were made to develop cold labelling techniques. In addition it was desired to have an instrument which imposed a very low or negligible restriction to gas flow.

Thus, a further aspect of the present invention provides a method of measuring the flow velocity of a fluid comprising the steps of: cooling the fluid at a selected point along its flow path, thereby creating a cool thermal pulse and detecting the said pulse with one or more detectors upstream or downstream of the selected point, the time of transit of the pulse being used to calculate the velocity.

It is believed that the idea of producing a "cool" pulse as opposed to a "hot" pulse has not previously been proposed for liquids or gases. The "cool" pulse may be produced in several ways. One possibility is to inject pressurised gas into the fluid flow to achieve Joule-Thomson cooling by expansion. The gas may be methane, butane or carbon-dioxide for example. Alternatively an amount of an extracted sample of the gas being measured, may be removed from the bulk of the fluid, cooled and then introduced into the flow under pressure. Another possibility is to introduce a pulse of liquefied gas, such as propane, into the fluid flow to cause cooling by evaporation. The use of liquefied propane has proved particularly satisfactory in practice.

Another aspect of the invention provides a method of measuring the flow velocity of a fluid comprising irradiating the fluid at a selected point along its path of travel, and timing the arrival of this label at, or time between detection upstream or downstream of, the irradiation point. For example, the fluid could be exposed to infra-red radiation. This method is expected to be particularly useful for gases which can absorb and re-radiate radiation, such as methane and carbon-dioxide. It is known that these gases can absorb and re-radiate certain infra-red frequencies. This could be further exploited to identify the constituent gases by selecting and or detecting particular frequencies of radiation. Such irradiation may be performed by delivering a modulated infra red source to the gas, for example with an optical fibre.

In all of the above methods, heating or cooling of the fluid preferably takes place momentarily. Advantageously this occurs at regular intervals, in order to provide one or more selected volumes of fluid having a markedly different temperature from the bulk of the fluid or adjacent volumes. Volumes of fluid are carried downstream and their arrival at detectors is timed to indicate flow rate of fluid being measured. Such heating or cooling may be carried out cyclically.

The present invention also provides apparatus for carrying out the aforementioned methods. Thus, one form of apparatus according to the invention for measuring the flow velocity of a fluid comprises means for cooling the fluid at a selected point along its flow path and means for detecting the temperature of the fluid upstream or downstream of the selected point.

Preferably means is provided for cooling. This may comprise means arranged to instantaneously cease heating the fluid for a predetermined duration as mentioned above.

The invention is particularly well suited for the measurement of the rate of flow of gases from landfill sites. Landfill sites are typically provided with exit pipes for the purpose of monitoring gases emitted to ensure that they do not exceed safe limits and/or for utilising the gas(es) for energy production. Such gases typically include methane. The abovementioned "cold" or "cool" pulse thermal labelling techniques are particularly attractive for this application because of their inherent safety. That is, there is no danger of inflammable gases being ignited. Likewise, the radiation heating technique has advantages in terms of safety as compared to a simple "hot wire" technique for example, which would only be suitable for non-flammable gases.

For certain applications, including measurement of gas flows from landfill sites, it is desirable to position temperature sensors on both sides of the cooling or heating point in the direction of fluid flow. Under certain conditions, a back flow of gases may be created which it is desirable to measure.

In a preferred embodiment of the invention, apparatus for measuring fluid flow comprises sensors which are provided for measuring the temperature of the fluid at at least two locations upstream and/or downstream of the heating or cooling point. This enables the apparatus to measure a greater range of fluid flow velocities. It is believed that the provision of temperature sensors at several locations has not been proposed previously in relation to liquids or gases. The position of a temperature sensor should be sufficiently distant from the heating or cooling source to give the thermal pulse time to take up a stable shape in the fluid flow and sufficiently close to the source to be able to detect the thermal pulse before it has dispersed. The optimum position of the sensors will vary depending on the actual flow velocity and hence the provision of a plurality of sensors at different locations extends the range of measurable velocities.

It will be appreciated that the term "upstream" and "downstream" are used to indicate the relative positions of sensors with respect to the heating or cooling point in normal flow. That is when gas is being removed from the landfill site there are sensors detecting temperature changes downstream from this point. Sensors upstream are not detecting any temperature changes, although they may be capable of such detection. However, as mentioned above, if there is a back flow of gas, then the normally "upstream" detectors become effective in detecting the temperature changes as there has been a flow reversal.

Methods corresponding to relevant apparatus are also described and it is understood that support for claims, directed to such methods, is found in the description.

Embodiments of the invention will now be described, by way of example only, and with reference to the drawings, in which.

Before describing embodiments of the invention in detail, a brief discussion of the theory behind the invention is set out below.

Experiments conducted in the 1950's have shown that a volume of liquid travelling in a long straight pipe which at a certain time is situated between two adjacent cross-section planes remains identifiable for a considerable distance downstream.

Experiments with laminar flow using a coloured dye to identify the volume of liquid show that the point of peak concentration of the dye travelled along the pipe at the discharge velocity and, surprisingly, the volume remained relatively compact as it progressed downstream. With turbulent flow, tested using a pulse of salt and measuring the conductivity downstream, the pulse dispersed more quickly but the peak concentration of the salt "identifier" was still clearly identifiable for a considerable distance downstream. This persistence of the "identifier" could not be expected when the fluid labelling agent is temperature because, unlike salt or dye, the heat can escape from the system by conduction through the pipe wall. Furthermore, even if a thermal labelling technique were suitable for liquids, it would not necessarily be applicable to gases in which the kinetic energy of the molecules is greater.

Figure 1:
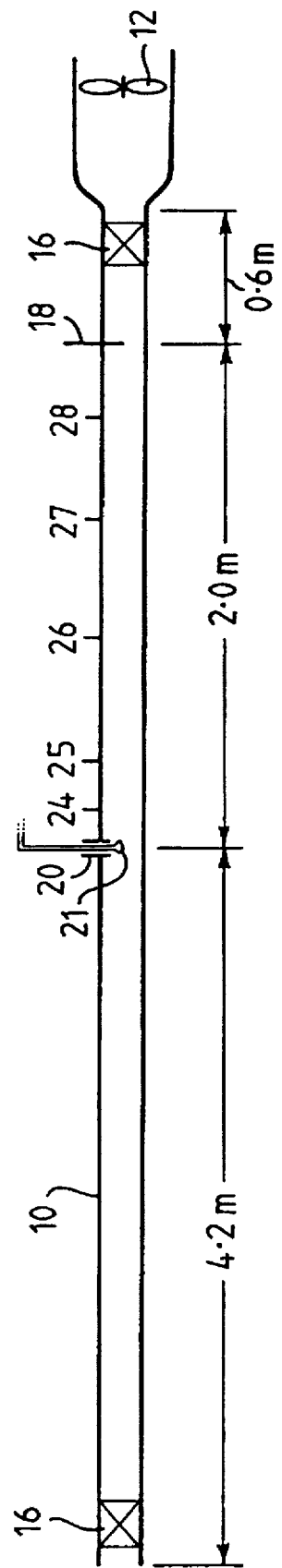
FIG. 1 is a schematic diagram of apparatus constructed to test the feasibility of measuring flow rates along gas pipes using a thermal labelling technique.

FIG. 1 illustrates apparatus constructed to investigate the feasibility of measuring the rate of flow of gases using a thermal labelling technique. The illustrated apparatus comprises a 50 mm diameter plastic pipe 10 having an overall length of 6.8 meters. At the downstream end an axial flow fan 12 is fitted and a flow of atmospheric air is induced in the pipe 10 by suction. Honeycomb flow straighteners 16 are installed at each end of pipe 10. Flow velocity is monitored using a commercial anemometer 18 positioned on the axis of the pipe 10. The apparatus was capable of producing air flow velocities of up to 5 meters per second in the pipe 10.

Energy, in the form of heat, is injected into the fluid flow by means of an electrical assembly 20 comprising a thin wire heating element 21 heated by the discharge through it of a capacitor. The electrical time constant ($\tau$) of the discharge is about 2 milliseconds. The heating element 21 is a coil of tungsten wire. Length of pipe 10 downstream of the point at which air enters the pipe is equivalent to about 84 diameters. This was considered sufficient for the establishment of fully developed laminar flow and therefore the best location for labelling. Provision was made for the insertion of temperature transducers. Thermocouple stations 24, 25, 26, 27 and 28 were provided 10, 20, 70, 120 and 170 cm respectively downstream of the electrical assembly 20.

Experiments were conducted using two temperature transducers, made using thermocouples arranged with their junctions on the axis of the pipe. The two thermocouples were inserted at various pairs of measuring stations. Output signals from these two temperature transducers were used to start and stop an electronic timer/counter (not shown) whose output gave an (inverse) indication of the velocity of the temperature pulse along the pipe 10.

Detailed comparisons of anemometer readings and counter readings were made over the entire range of velocities investigated, namely 0.5 $ms^{-1}$ to 5 $ms^{-1}$. Thermocouples triggered the timer/counter reliably without the need to adjust heat input. Measurements were made on both the leading and trailing edges of the thermal pulse but not the peaks.

Figure 2:
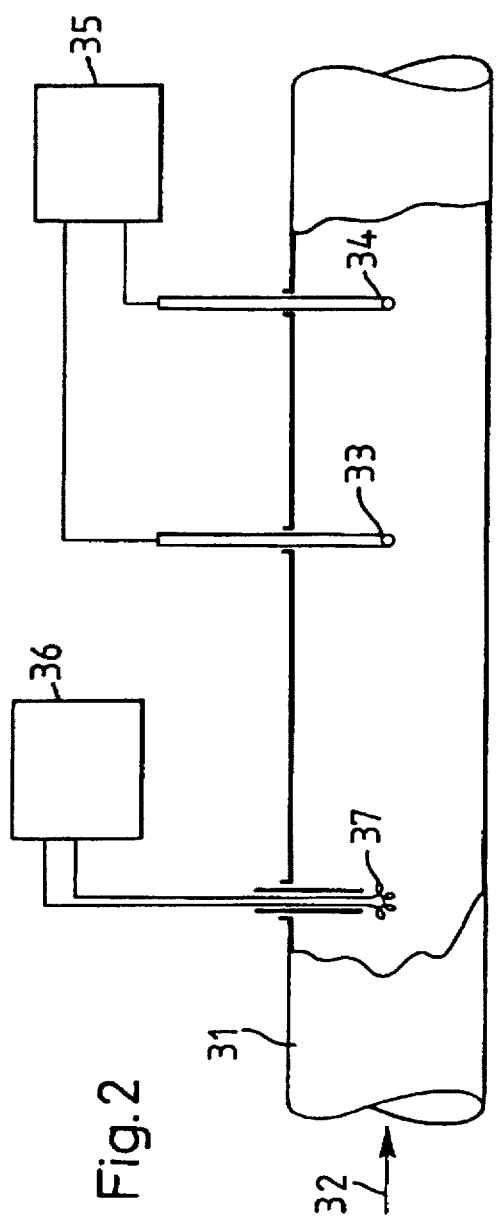
FIG. 2 is a schematic diagram of a first embodiment of an apparatus according to the invention.

A first embodiment of apparatus according to the invention will now be described with reference to FIG. 2. The illustrated apparatus is intended for measuring fluid flow in a pipe 31 in the direction of arrow 32. The apparatus comprises two temperature sensing devices, 33 and 34, output circuit means 35 for amplifying the output from the devices 33 and 34 and for providing an indication of flow velocity. A source of electrical energy 36 supplies electricity to a resistive heating element 37. The temperature sensing devices 33 and 34 may comprise thermocouples, thermistors, pyroelectric detectors or radiation (e.g. infrared) detectors. The latter would be particularly suitable if the fluid was of a type which would re-radiate thermal energy. Infra-red or other radiation detectors could be positioned outside the pipe to receive radiated energy from the fluid via a window provided in the pipe.

Output circuit means 35 typically includes an amplifier for amplifying signals received from the devices 33 and 34 and a timing circuit for timing the interval between the arrival of signals at the two detectors. Circuitry is provided for detecting peaks in electrical signals received from the devices 33 and 34. Timing circuitry times the interval between the peaks. Alternatively, the timing circuitry may be arranged to time the interval between signals of a specific amplitude received from the devices 33 and 34. Thermocouples are preferably fitted on the lower surface of pipes to prevent build up of condensation. Thermocouple probes may comprise noble metals.

The electrical energy source 36 is arranged to deliver a pulse of electrical energy to the resistive heating element 37 at selected intervals. The durations of the pulses would typically be of the order of milliseconds.

FIGS. 3 to 6 show further embodiments of the invention. Items numbered 31 to 36 In FIGS. 3 to 6 are the same as items 31 to 36 described above in relation to FIG. 2.

Figure 3:
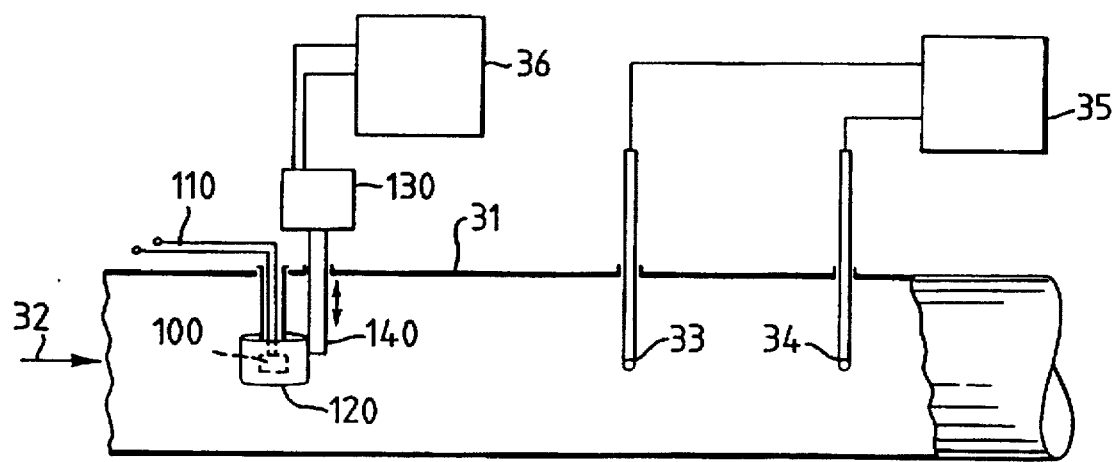
FIG. 3 is a schematic diagram of a second embodiment of an apparatus according to the invention.

Referring now to FIG. 3, the apparatus illustrated in this Figure includes a heating or cooling source which is intended to be continuously energised and momentarily exposed or revealed to the gas whose velocity its being measured at regular intervals.

Reference numeral 100 indicates a heating or cooling device such as an electrical resistance or a Peltier-effect device for heating or cooling passing fluid. Reference numeral 110 indicates the lines for supplying electricity to the device 100. An annular shield 120 surrounds the device 100 to minimise or eliminate heating or cooling of the fluid by the device 100 whilst in position. The shield 120 is attached to a plunger 140 driven by a solenoid 130 in the direction of the indicated arrow to raise the shield so that passing fluid will be heated or cooled by the device 100. The shield is raised at regular intervals to enable selected volumes of the fluid to be heated or cooled.

Alternatively, the shield could be mainly away from the heater/cooler and then, when steady state conditions are reached, be made to surround it.

Figure 4:
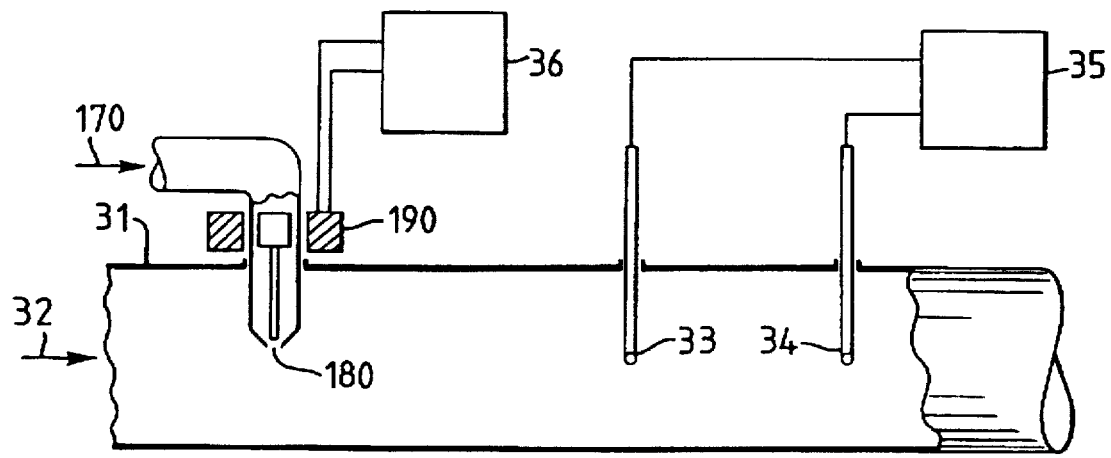
FIG. 4 is a schematic diagram of a third embodiment of an apparatus according to the invention.

FIG. 4 shows a further embodiment of the invention in which a "pulse" or volume of cold fluid is produced by injecting either an amount of pressurised gas or liquefied gas which will evaporate at the working temperature into the fluid flow. Reference numeral 170 indicates a source of pressurised gas or volatile liquid which enters the pipe 31 (angle not important) thereto and ends at nozzle 180. The nozzle 180 may be opened and closed by means of an electrical solenoid valve 190 which momentarily opens the nozzle 180. The solenoid coil is positioned outside the pipework for reasons of safety.

In the case of pressurised gas, a measured amount of the gas is released by means of the solenoid valve 190 which then expands inside the pipe 31 and undergoes Joule Thomson cooling. This pulse of cold gas also cools neighbouring fluid flowing through the pipe and produces a pulse of fluid of reduced temperature. In the case of volatile liquid, such as liquefied gas, a measured amount is released by means of the solenoid valve 190 which immediately evaporates on entering the pipe 31. The latent heat of evaporation is taken from the surrounding fluid. This causes cooling of the fluid and a thermal label is created.

Figure 5:
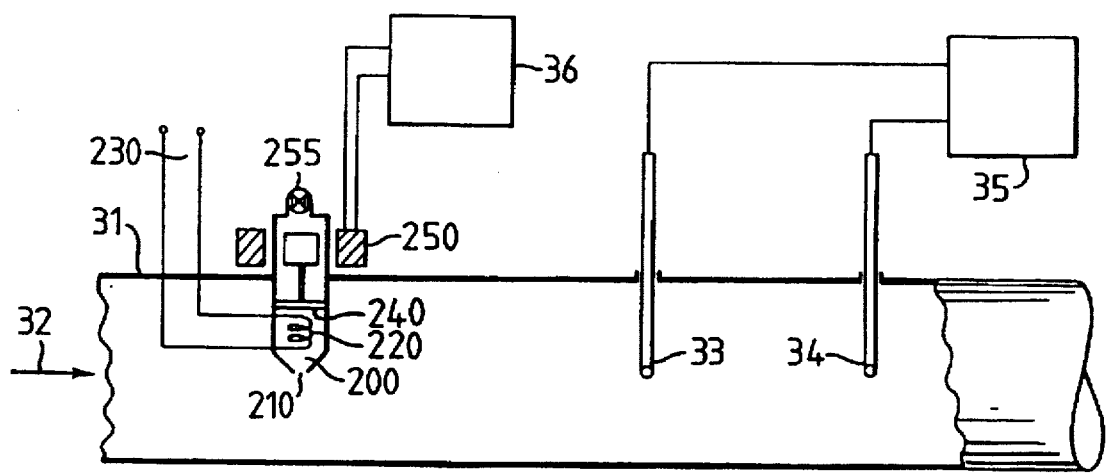
FIG. 5 is a schematic diagram of a fourth embodiment of an apparatus according to the invention.

FIG. 5 shows a further embodiment of the invention in which a volume of gas or liquid is preheated or cooled and then injected into the gas or liquid whose flow velocity is being measured. The fluid to be preheated or cooled is contained in a chamber 200 having a nozzle 210 located preferably on the centre axis of the pipe 31. Fluid in the chamber 200 is heated or a cooled by means of a device 220 which is illustrated as a resistive heating element but which may also comprise a cooling device, e.g. a Peltlet effect device. Lines 230 indicate the electrical supply to the cooler or heater. A piston 240 is attached to a plunger which is driven by a solenoid 250 to expel fluid from the chamber 200. The chamber 200 is preferably insulated to avoid conduction between the inside and outside of the chamber. The fluid contained in the chamber may be taken from the flow whose velocity is being measured or drawn from an external source such as the surrounding air, in the latter case a one-way valve would be required 255.

Figure 6:
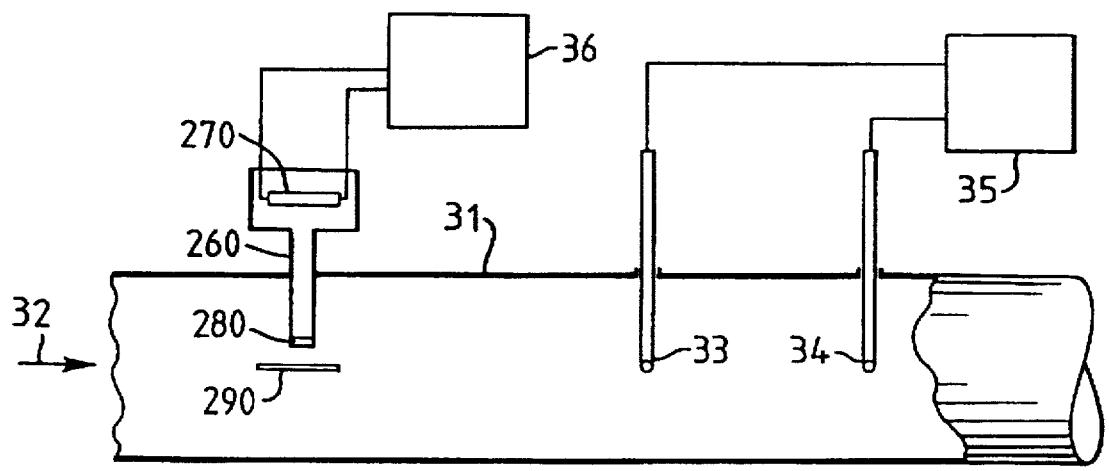
FIG. 6 is a schematic diagram of a fifth embodiment of an apparatus according to the invention.

FIG. 6 shows a further embodiment of the invention in which a volume of fluid is heated using a radiant heat source. Reference numeral 270 indicates a source of radiant energy such as infra-red emission from a gas discharge device, or a sufficiently heated body exposed to the fluid momentarily by means of a shutter, or a pulsed or shuttered laser (not shown). In the illustrated embodiment, radiant energy is directed to the fluid via a pipe 260 closed by a window 280. Alternatively, radiation is conducted to the pipe via an optical fibre (not shown). The radiated energy heats a target in the form of an absorbent body 290 (e.g. a "black body" for infra-red) which then warms the surrounding fluid to create a hot pulse which travels towards sensors 33 and 34. In the case of a fluid which can absorb infra-red radiation such as carbon dioxide and methane gases, the absorbent body 290 is not necessary since the radiation is directly absorbed. This could also be operated as a steady state 'cooling by not heating' device.

A detailed experiment using a further embodiment will now be described with reference to FIGS. 7 to 11. These Figures describe an experiment which was carried out in situ.

Figure 7:
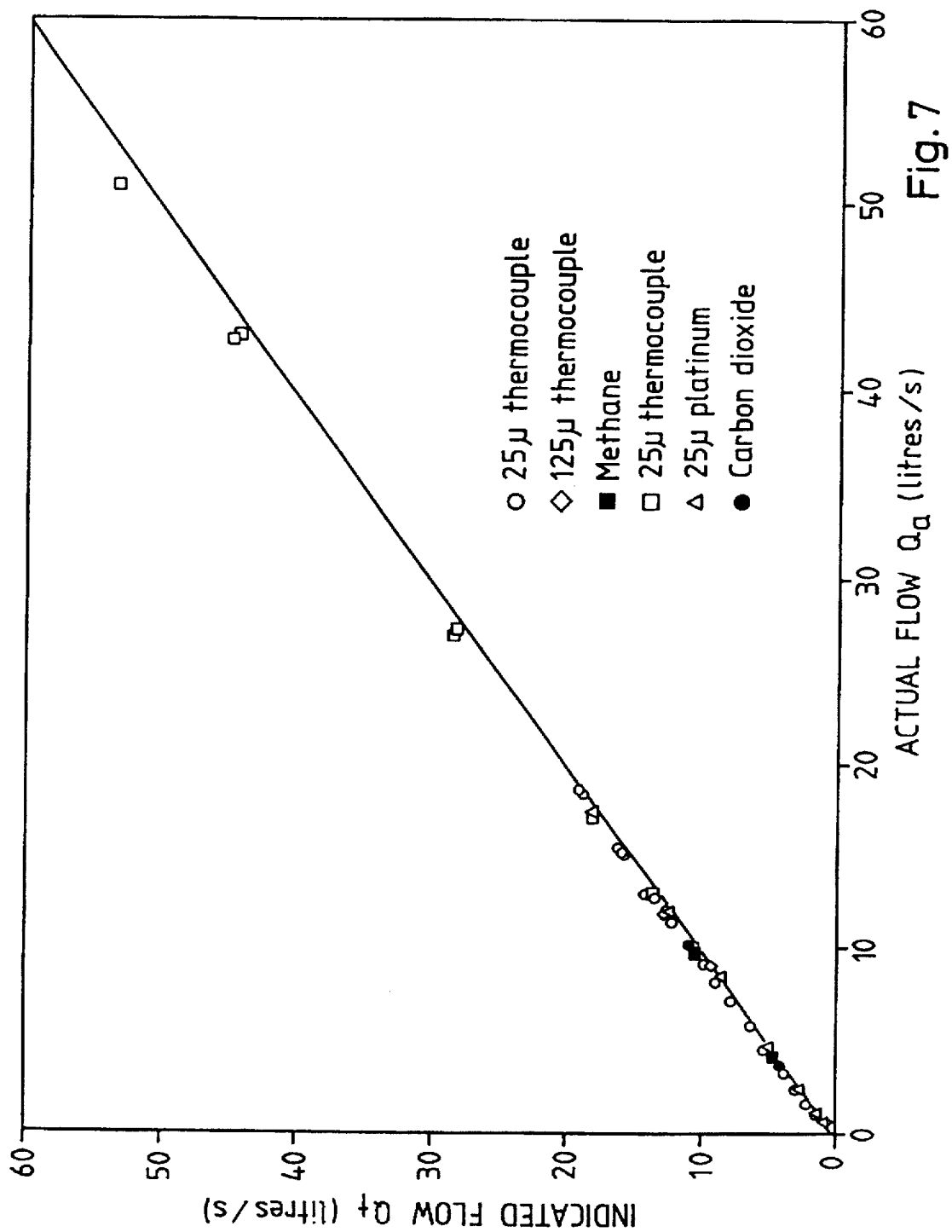
FIG. 7 shows a graph of results of laboratory trials using methane and $CO_2$.

Referring to the FIGS. 7 to 11, assessment of accuracy, for air, carbon dioxide and natural gas, were made, using a calibrated 'Jeavons' volumetric gas meter for flow rates up to 9.0 m/s, and a standard BS 1042 orifice plate above this velocity. Within the limits imposed by the measuring equipment, these experiments showed that during the transition from laminar to turbulent flow a correction could be applied to the estimated volume flow data which yielded an accuracy of ±5%. For entirely laminar or turbulent flow conditions, which, with appropriate choice of pipe size would normally be the case, accuracy of ±2% or less was demonstrated. Results for laboratory trials are shown in FIG. 7.

Since a host micro-computer is particularly suited to identifying thermal peaks, which has been found to be essential for accurate measurement by the thermal pulse method, calculation of the laminar to turbulent volume flow correction may also be performed by the computer alongside timing, dating and data-logging functions.

These phase 1 laboratory trials provided the basic specification for a field instrument, as follows:

1. 125 μm CHROMEGA (Trade Mark) Constantan thermocouple probes are sufficiently corrosion-resistant and have adequate response times. PVC, epoxy resin, aluminium and stainless steel are suitable for other components.

2. Pulsed delivery of liquid propane was safe and effective.

3. A 50 mm internal diameter pipe was used. This was the most appropriate way of relating laboratory experiments to subsequent field trials.

4. Spacing of thermocouples was selected to achieve best performance when more was known about actual flow rates and hence nature of flow.

5. Thermocouples should be mounted from below to eliminate the effects of condensation.

6. An in-built microcomputer was capable of providing timed pulses, recording date and time, recording time of transit, converting time of transit to volume flow, correcting volume flow in relation to calculated Reynolds Number and transmitting this data to an on-site SOLOMAT (Trade Mark) data logger via a 420 mA current loop.

Following installation, a detailed overnight measurement was taken with a sampling rate of 20 seconds. The instrument was then left to run for one month with a sampling rate of 10 minutes and data was again collected. Data was subsequently collected for a further three months.

Sensors and amplifiers continued to give a full output. Thus the main emphasis of the study, the instrument rather than its associated electronics, continued giving satisfactory results.

Figure 7A:
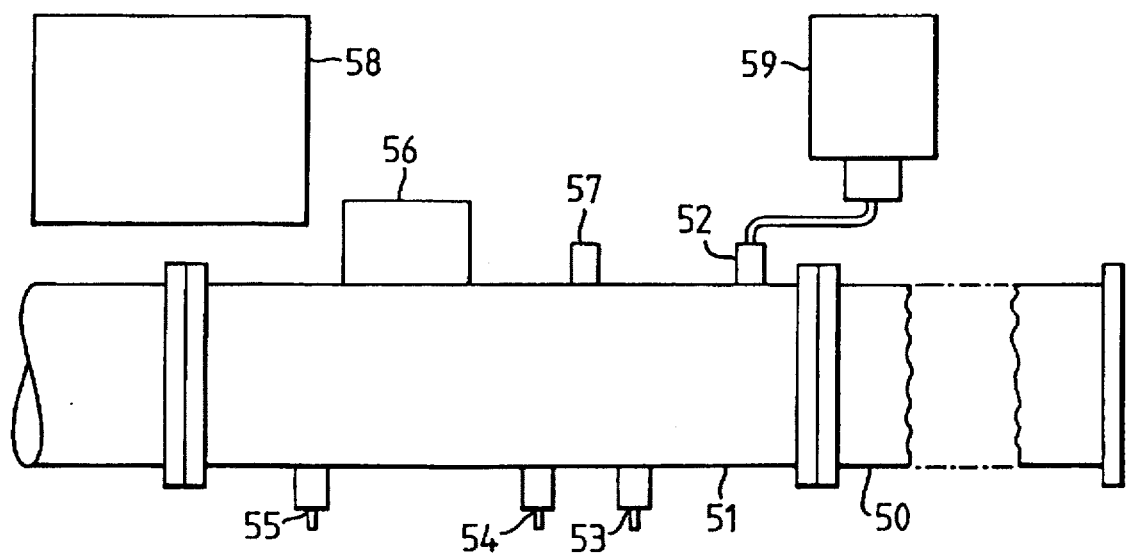
FIG. 7a is a diagrammatical overview of an embodiment of an apparatus according to the invention.

FIG. 7a shows pipe Sections 50 and 51. These are 1 m lengths of 52.5 mm internal bore class E PVC tubing. This conforms dimensionally with Schedule 40 pipework.

Joints were made with solvent-bonded flanges, drilled to ANSI 300 specification and backing rings (not shown) were used to maintain a uniform compression on the FPM gaskets.

PVC saddles were solvent-bonded to the pipe 51 at the locations 52, 53, 54, 55, 56, and 57, and through-drilled where appropriate to accept the following components.

At position 52—BOSCH M717 (Trade Mark) cold-start vehicle petrol injector

At position 53—'start timer' thermocouple probe

At position 54, 55—'stop timer' thermocouple probe (alternative locations)

At position 56—Analogue amplifiers with Zener barriers

At position 57—IP65 Sealed sealed 'trickle charge' capacitor slave unit for supplying electrical pulses to the injector An IP65 Sealed control unit 58, housing power supply, microcomputer, display and keypad was mounted above the pipework. A propane cylinder 59, was mounted above the flowmeter for liquid delivery.

The injector 52 was primarily selected for ease of mounting, since almost any vehicle device is capable of operating times down to about 1–5 milliseconds. Microcomputer software capable of varying the pulse width in relation to thermocouple signal was installed, with an increasing pulse width following a reduced signal. This was found to be unnecessary and the operating period to date has been left at 5 milliseconds.

A slave unit for operating the solenoid was selected for two reasons. Firstly no pulsed current load is applied to the power supply which is shared by the microcomputer. Secondly in the event of an error in the controller resulting in a permanent 'on' signal, only one pulse gives rise to propane delivery, since insufficient current would be available from the 'trickle charge' circuitry for further operation of the injector. This is an important safety feature.

Figure 7B:
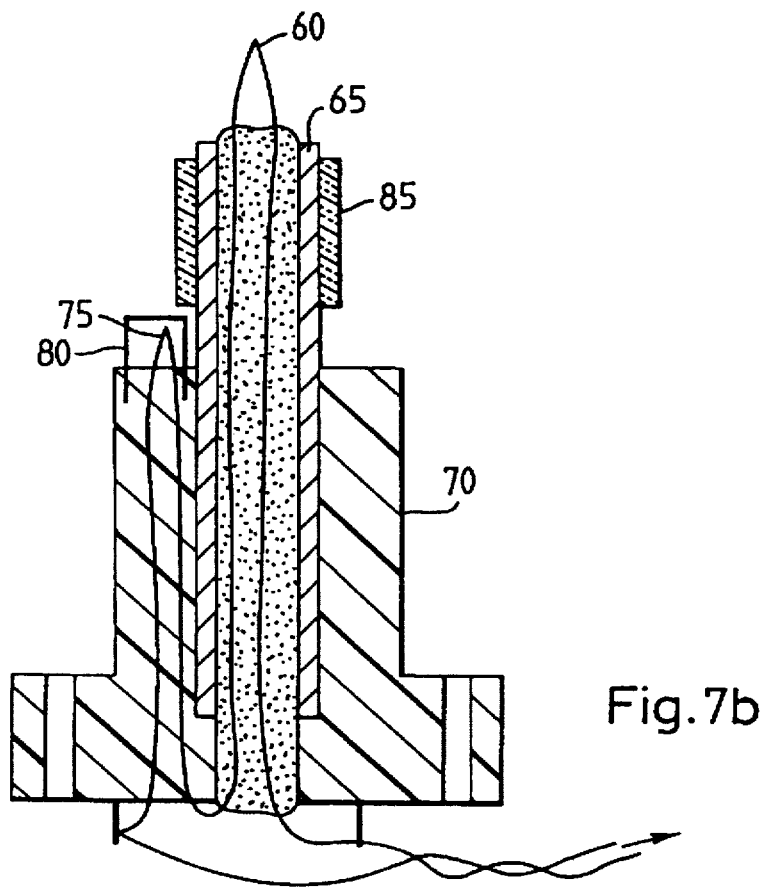
FIG. 7b is a sectional view of a thermocouple probe.

Both thermocouple probes, Installed at locations 53, 54 or 53, 55 were identical and constructed as shown in FIG. 7b. Locations 53, 54 were chosen soon after installation, since the highly variable flow rate was found less than 0.90 ms$^{-1}$.

Each 125 µm CHROMEGA/CONSTANTAN (Trade Mark) sensing thermocouple 60, was epoxy-mounted in a suitably prepared 3 mm Outer Diameter (OD) stainless steel tube 65. The tube is a force fit into an acetal probe holder 70, which terminates flush to the inside surface of the flowmeter bore and also forms a mounting flange for the complete assembly. The sensing thermocouple 60, protrudes 3 mm beyond the end of its support tube and the exposed wires below the function are bowed to disperse any condensation droplets not removed by gravity. A thermal insulator sleeve 85, surrounds the 3 mm O.D. tube to isolate it from unimportant changes in temperature.

Protruding from the acetal body 2 mm into the gas flow is a second identical thermocouple 75. This is mounted inside a 3 mm diameter aluminium cylinder 80, of large thermal mass compared to the exposed thermocouple. The two junctions are connected in series with opposite polarity to each other. Thus compensation is achieved for changes in ambient temperature.

Output from the above sensors was connected to two amplifiers in housing 56 as shown in FIG. 7a.

Since a relative, rather than absolute, temperature measurement its involved, there is no need for cold junction compensation as is normally the case with thermocouples. The gain of amplifier, (typically of a maximum approximately 50000), is non-linear, providing automatic amplitude attenuation, this method has the potential for considerably extended operation with a highly degraded thermocouple signal. In the above case non-linear gain was achieved by incorporating silicon diodes in the amplifier feedback network, this gave an approximately logarithmic response. Thermisters were used as an alternative and similar low signal enhancement was achieved.

Amplifier output had a preset peak value of 5V and was AC-coupled to associated instrumentation to reject any errors due to output drift.

Control unit 58 housed an ESSEX CONQUEROR (Trade Mark) microcomputer. This provides full supervisory control of all flowmeter functions. A Keypad permits alteration to various parameters such as sample rate and pulse width. Analog-to-Digital convertors (ADC) provide data for pulse-peak logging and timing. Internal software then calculated the volume flow in m$^3$hr$^{-1}$.

$$Q = \frac{\pi D^2 L \times 3600}{4t}$$

where D=pipe diameter=0.052 m
L=sensor spacing=0.10 m
t=pulse peak transit time in seconds However, as noted earlier, and based on data from previous studies, a correction to Q is required, depending on whether the flow was laminar, transitional or turbulent. This would not normally be required if an 'appropriate' pipe diameter was selected'.

Figure 8:
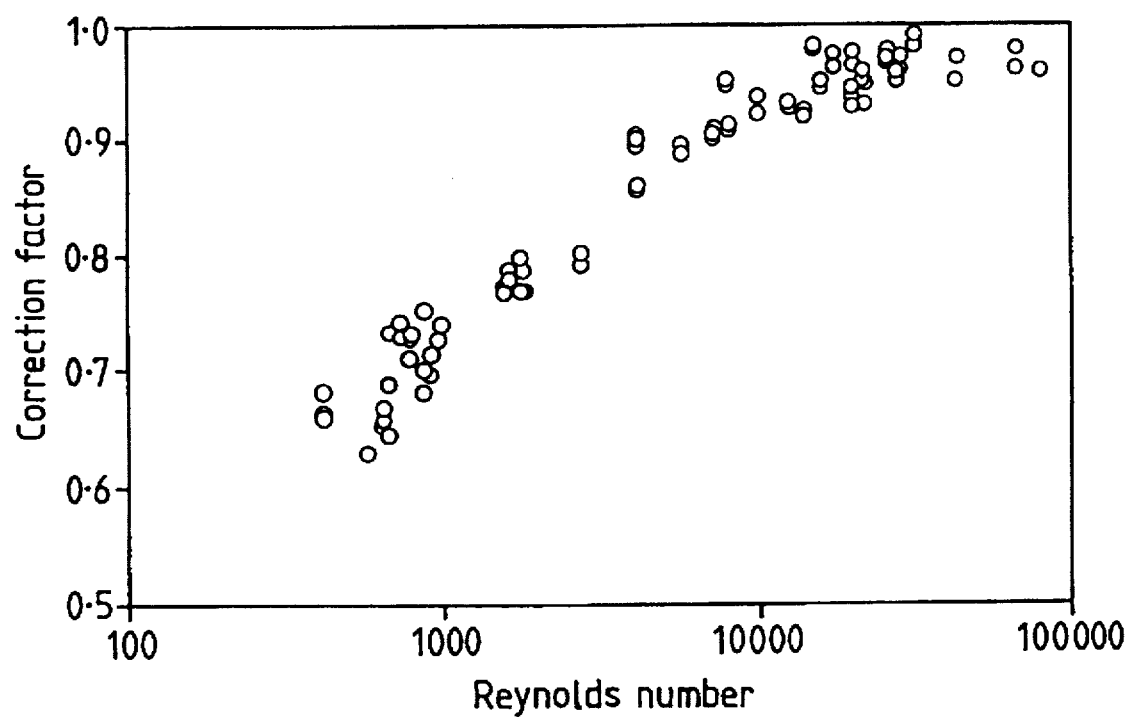
FIG. 8 is a graph of correction factor against Reynolds Number during this transition from laminar to turbulent flow.

To apply the necessary correction suggested by the laboratory data shown in FIG. 8 flow Reynolds Numbers would have to be calculated each time a 'shot' was recorded. This requires information about gas mixture present since density, viscosity and temperature must be known. The computer reduces the volume flow logged and dated by a percentage correction between 50% (for Reynolds <200) to 91% (for Reynolds Number >10,000). Ten corrections were taken between these points based on the data in FIG. 8.

Since temperature and gas ratio data was not available, gas mixture was taken to be 50:50 CH$_4$:CO$_2$ and ambient temperature assumed to be 20° C. However, provision was made in the resident computer program for calculation of density and viscosity for any temperature above 0° C., if temperature data is available as an electrical input. Similarly, gas mixture data was processed if available.

The gas constants, R$_{CH4}$, R$_{CO2}$, for each constituent gas were found at 0° C. and standard pressure. For a 50:50 mixture, the density average ρ, was calculated at ambient temperature, T° C. where $$\rho_{CH_4} = \frac{1.013 \times 10^5}{R_{CH4} \times (273+T)} \text{ and } \rho_{CO_2} = \frac{1.013 \times 10^5}{R_{CO2} \times (273+T)}$$

Viscosity, µ, at ambient temperature, was calculated on the basis of the viscosity of air and the average relative value for a 50:50 CH$_4$, CO$_2$ mixture.

Viscosity for air, µ$_a$, at temperature T, was calculated according to Sutherland's empirical formula, $$\mu_a = \frac{1.458 \times 10^{-6} + T^{3/2}}{T + 111.4}$$

Relative viscosities were obtained from published data.

| Gas | Viscosity n/µs s m$^{-2}$ at 20° C. | Relative viscosity |
|---|---|---|
| Air | 17.3 | |
| CO$_2$ | 13.6 | 0.78 |
| CH$_4$ | 10.3 | 0.59 |

For a 50:50 mixture, the viscosity average was calculated at ambient temperature T° C.

where, µ$_{CH4}$=µ$_a$×0.459 and µ$_{CO2}$=µ$_a$×0.78

The Reynolds Number was calculated based on ambient temperature values of ρ and µ and the appropriate correction to volume flow was calculated based on the laboratory data described earlier. This result was rounded down and transmitted in the form, 0–10 m$^3$/hr=4–20 mA, to a SOLOMAT MPM 4000 (Trade Mark) data logger, which updated the reading every two hours.

An on-board real-time clock initiated each measurement. Although samples were made on a twenty second and ten minute period, any time increment from seconds to hours could be pre-selected from the control keypad.

Figure 9:
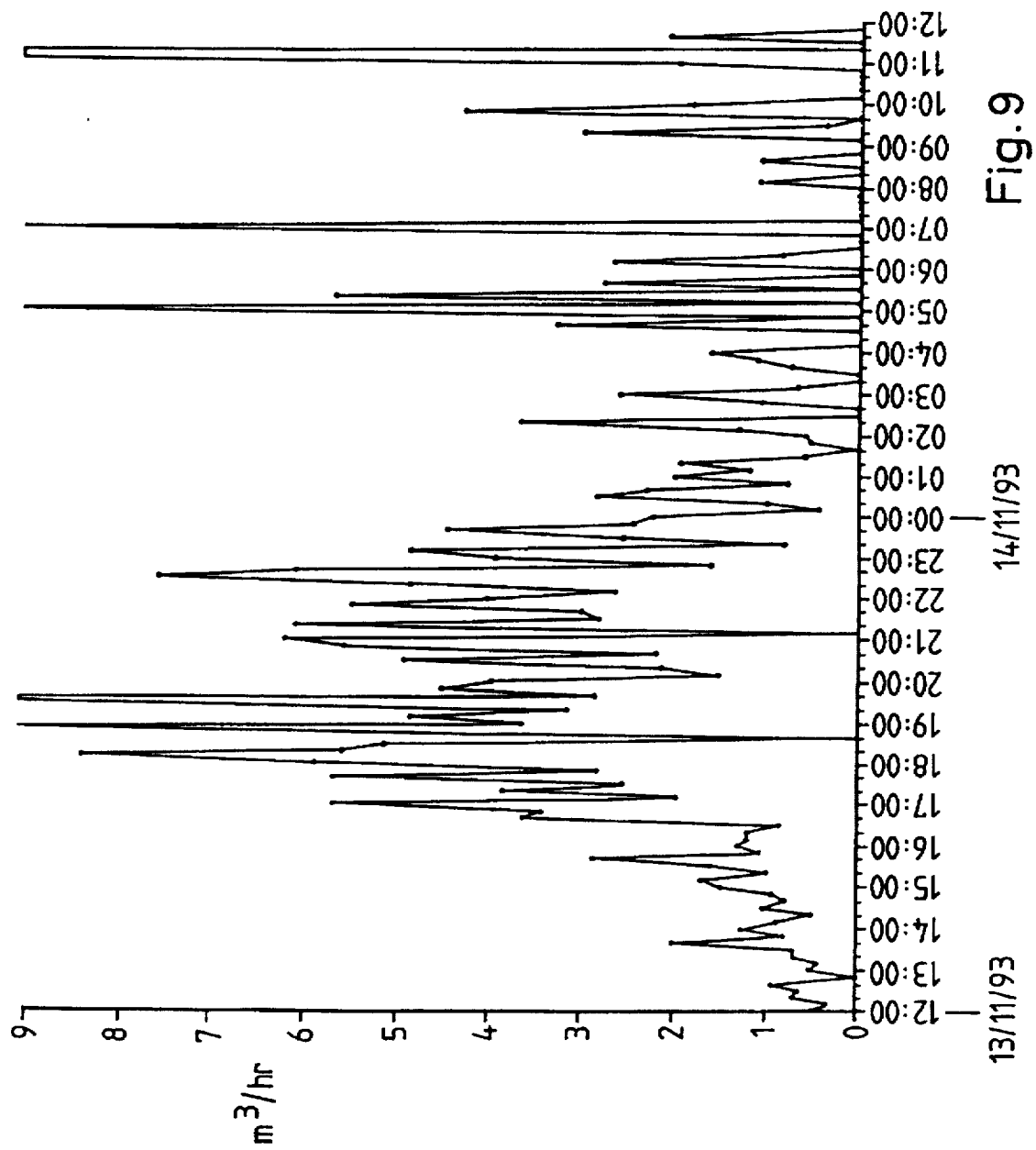
FIG. 9 is a graph of a sample 24 hour log of gas flow rate in $m^3 hr^{-1}$.
Figure 10:
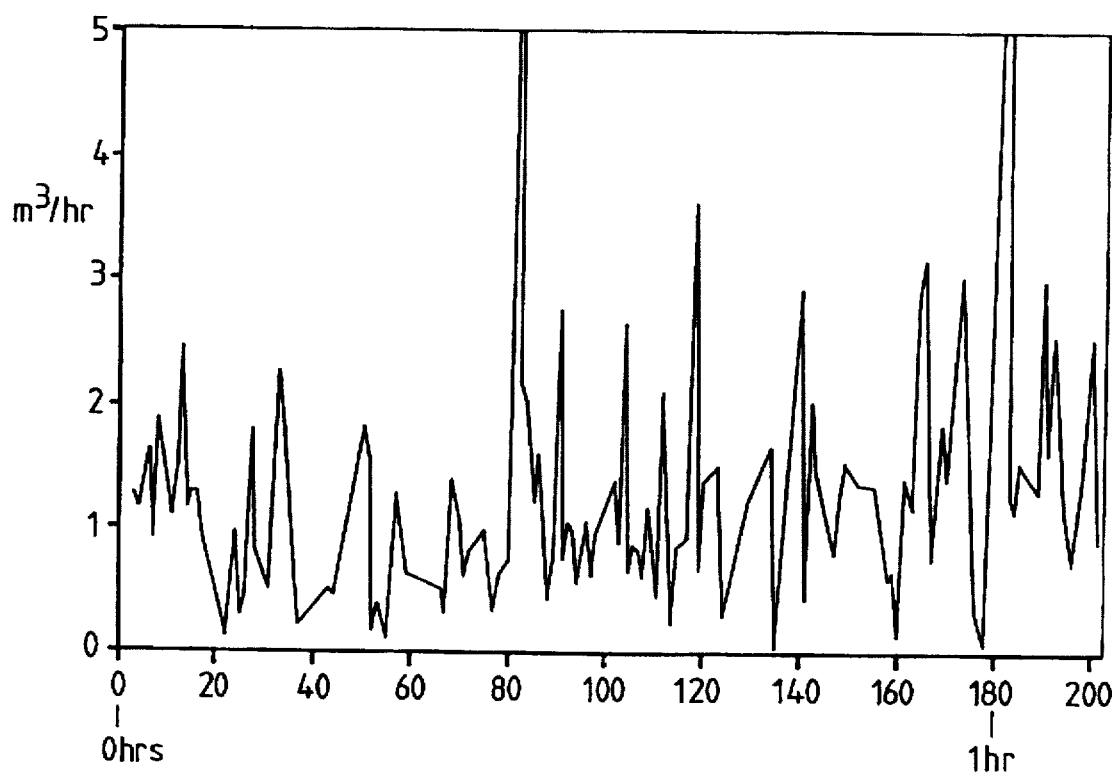
FIG. 10 is a graph of a sample 1 hour log.
Figure 11:
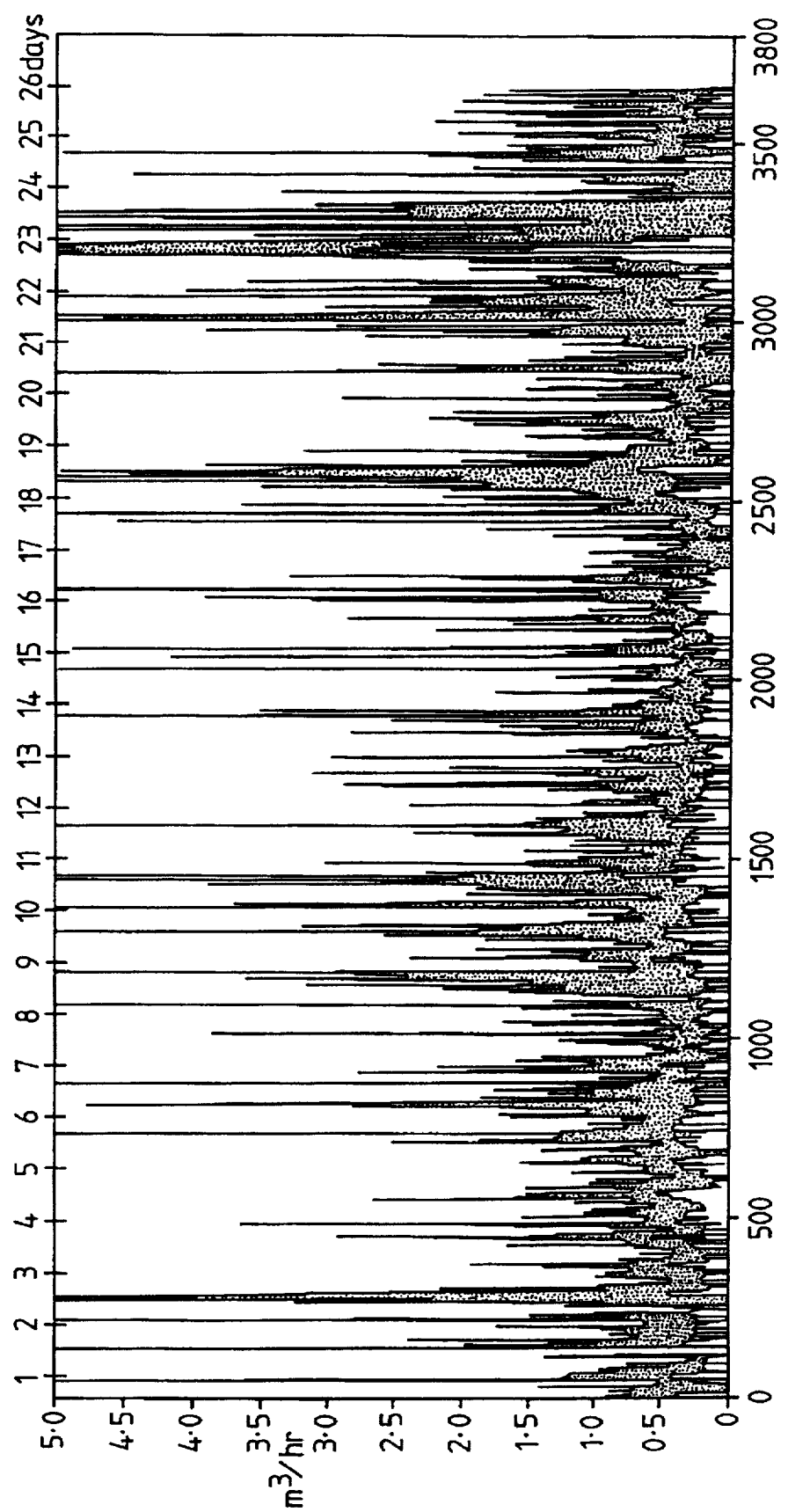
FIG. 11 is a graph of a 26 day log.

Data, including certain diagnostic codes, was logged, and downloaded monthly to a portable computer. A graphical sample presentation of the results, showing volume flow against time, was obtained by post-processing. These are shown in FIGS. 9, 10 and 11.

RESULTS

Materials

After four months' operation, no visible degradation had occurred in any of the materials used in construction of the flowmeter. The thermocouple tips of probes 53, 54 were still clean and the epoxy resin in which they were held showed no pitting. On removal, the thermal insulating sleeve 85, FIG. 7b, was seen on each inspection to be covered with water droplets, demonstrating the high humidity of the gas.

Care was taken not to touch the probes and following reinstallation they continued to give a full output.

Gas Consumption

The gas cylinder was weighed and approximately 0.4 kg of propane had been consumed in 28 days. This could have been reduced, since the selected 'shot' time of 5 ms has since been found to be needlessly long; half this period would be adequate. Although an 11 kg cylinder was installed, this being the standard size for liquid feed, in practice shorter 'shot' times and further amplification of the sensor outputs suggest a small, say 2 kg, hand blowlamp cylinder may be all that is necessary for one year's unattended operation.

No sensor data error codes were indicated until near the end of the first month, when the electronics module failed to log data properly. It can therefore be assumed that full liquid propane delivery was maintained for this period. This is noted since mounting arrangements for the cylinder were found to be important in test carried out on site during installation. These tests showed that since the liquid/gas pressure distribution is the same in both pipework and cylinder, a small increase in temperature in the pipe could lead to gas and not liquid being delivered to the injector. By mounting the cylinder above the injector and ensuring a steep downward run in the delivery pipe, this problem was easily overcome, since under normal circumstances the pressure gradient due to gravity is greater than that arising from normal temperature fluctuations.

Ambient Temperature

When the instrument was installed, and again when examined after one month in use, overnight frosts had occurred. When the site was visited after one month, puddles remained icy all day; sensor outputs went to their 5 volt peak value in these conditions, suggesting there would be no problem with low temperature operation.

Flow Data

Since operation for one day with measurements at twenty-second intervals, or one month with a ten-minute interval, (both requiring over 400K bytes of memory), it was not possible to run the device at higher sampling rates for a month with memory available. Memory could be extended considerably; however, gas consumption, at this high sample rate, even with the improvements given earlier, would be unfeasibly large, about 6 kg per month. A cylinder of the size used in LPG vehicles would only give about three months' operation. Alternative thermal-labelling techniques, may overcome this problem.

For the majority of flow rates encountered, flow was rarely fully laminar or turbulent. This means that corrections were applied based on laboratory experiments, with the Reynolds No, on which these corrections were based, calculated according to assumptions about gas mixture and temperature. Consequently an error of possibly ±10% is likely between about 0.2 and 2 $m^3 hr^{-1}$. Whilst better information about gas temperature and mixture could be supplied to the computer, other factors such as pipe roughness, might still influence accuracy when operating in this difficult transitional region.

A simpler solution, particularly with an instrument which has such a large turn-down ratio, would be to use a larger pipe to ensure laminar flow or, as was the case with Endress and Hauser, a smaller pipe to ensure turbulent flow. Another method would be to identify the onset of turbulence such as by 'listening' to the flow. Rather than use impirical data to correct for transitioned flow, it would be possible to identify the onset and extent of turbulence by a variety of means. Sensors across the flow could provide data about the velocity 'profile' and thus prescribe the amount of correction required when calculating volume flow.

Site Flow

FIGS. 9 and 10 show respective measured volume flow for a ten minute and 20 second sample frequency.

They indicate that over a one-hour—and in the second case, one-day—period, overall flow is highly irregular, at times ceasing altogether, with the possibility of flow reversal.

Long-term flow trends, possibly attributable to such influences as climatic conditions, air pressure, temperature and liquor pumping, could be investigated when flow data is presented, as shown in FIG. 11. A more detailed examination could be made by comparing the above phenomena with numerical data from a downloaded computer file. Accumulated total volume flow also might be presented in graphical form to examine periodic trends in gas production.

The above-described embodiments of the invention include only two sensors, 33 and 34. However, as mentioned above, it is desirable for further sensors to be included to extend the range of measurable velocities. These additional sensors could be selected, preferably by computer to provide optimum accuracy for different velocities, thereby extending the range of the instrument or its turndown ratio.

It will be appreciated that variations to the above embodiments may be made without departing from the scope of the invention. For example the invention may be manufactured or sold in the form of a kit of parts. Thus, for example, sensors, coolers and processing means may be provided for retro-fitting to existing pipework. Alternatively the invention may be sold in the form of a complete device housed in a section of pipe or tube for insertion into an existing path of a fluid, which may be in a landfill site or otherwise. Although specific reference has been made to use of the invention in a landfill environment it may be utilised in the oil industry, chemical engineering or processing industries, food processing, nuclear industries or any other application where flow rates of liquids, slurrys, gases or mixed phase flowing substances are to be measured, especially when these flow rates are low.

Furthermore, it will be appreciated that the invention its capable of being used at elevated temperatures in excess of 100° C. and is not limited to temperature ranges described in the description.

We claim:

1. Apparatus for measuring fluid flow velocity comprising:

means for varying an energy content of a volume of a fluid at a first preselected point in a flow path; and means for detecting the variation in the energy content of the fluid at a second preselected point in the flow path downstream of said first preselected point, wherein said varying means includes means for injecting a quantity of liquefied gas into the fluid thereby to create said variation in energy content, wherein said liquefied gas is at least one of a different composition and a different phase then said fluid.

2. Apparatus according to claim 1, wherein said detecting means comprises a first temperature sensor and wherein said apparatus further includes a second temperature sensor positioned at a third preselected point, the second preselected point being positioned between the first and third preselected points such that detection of the variation in temperature occurs at the third preselected point after detection at the second preselected point.

3. Apparatus according to claim 1, wherein the injecting means is constructed and arranged such that gas is injected automatically and at a predetermined time instant.

4. Apparatus according to claim 3, further comprising means for varying the intervals of injection of the liquified gas.

5. Apparatus according to claim 3, wherein the varying means utilizes the temperature of the fluid to vary the intervals of injection.

6. Apparatus according to claim 1, constructed and arranged to measure saturated gases.

7. Apparatus according to claim 1, constructed and arranged to measure explosive gases.

8. Apparatus according to claim 1, constructed and arranged to measure gas flow from landfill sites.

9. Apparatus according to claim 1, further comprising processing means for calculating flow rate of the fluid.

10. Apparatus according to claim 1, wherein the liquified gas comprises pressurized propane gas.

11. A method for measuring fluid flow velocity comprising the steps of varying the energy content of a volume of fluid at a first preselected point in a flow path;

measuring the said variation in energy at at least a second preselected point in the flow path; and calculating the velocity of the fluid in the flow path from the dimensions of the flow path, and time interval between varying the energy content of the fluid at the first said point and measuring the variation at the second and subsequent points, wherein the energy content is varied by injection of a quantity of liquified gas into the volume of fluid.

* * * * *